United States Patent
Alegria Azkaiturrieta

(10) Patent No.: US 10,611,233 B2
(45) Date of Patent: Apr. 7, 2020

(54) RADIATOR SUPPORT

(71) Applicant: Cikautxo, S. Coop., Berriatua (ES)

(72) Inventor: Maite Alegria Azkaiturrieta, Markina-Xemein (ES)

(73) Assignee: CIKAUTXO, S. COOP., Berriatua (ES)

(*) Notice: Subject to any disclaimer, the term of this patent is extended or adjusted under 35 U.S.C. 154(b) by 0 days.

(21) Appl. No.: 16/295,385

(22) Filed: Mar. 7, 2019

(65) Prior Publication Data

US 2019/0299771 A1  Oct. 3, 2019

(30) Foreign Application Priority Data

Mar. 28, 2018 (EP) .................................... 18382218

(51) Int. Cl.
| | |
|---|---|
| *B60K 11/04* | (2006.01) |
| *F28F 9/00* | (2006.01) |
| *B62D 25/08* | (2006.01) |
| *F16F 1/373* | (2006.01) |
| *F16F 15/08* | (2006.01) |

(52) U.S. Cl.
CPC ............ *B60K 11/04* (2013.01); *B62D 25/084* (2013.01); *F16F 1/3732* (2013.01); *F16F 15/08* (2013.01); *F28F 9/002* (2013.01); *F28F 2275/143* (2013.01)

(58) Field of Classification Search
CPC ................................ B60M 11/04; B62D 5/084
USPC ........................................................ 180/68.4
See application file for complete search history.

(56) References Cited

U.S. PATENT DOCUMENTS

| | | | | |
|---|---|---|---|---|
| 2,273,869 A | * | 2/1942 | Julien | .................. F16F 1/3732 |
| | | | | 267/153 |
| 3,261,422 A | * | 7/1966 | Jensen | ..................... B60N 2/38 |
| | | | | 180/89.17 |
| 4,121,682 A | * | 10/1978 | Schaal | .................. B60K 11/04 |
| | | | | 180/68.4 |

(Continued)

FOREIGN PATENT DOCUMENTS

| | | |
|---|---|---|
| CN | 104482090 A | 4/2015 |
| JP | 2000038038 A | 2/2000 |

(Continued)

OTHER PUBLICATIONS

Extended European Search Report in corresponding European Application No. 18382218.8, dated Sep. 18, 2018, 20 pages.

*Primary Examiner* — Jeffrey J Restifo
(74) *Attorney, Agent, or Firm* — Edell, Shapiro & Finnan, LLC

(57) ABSTRACT

According to one embodiment a radiator support is provided that includes a support base and an elastic tubular portion which protrudes axially from the support base and is configured for housing a pin of a radiator of a vehicle. The radiator support also includes at least one stop which protrudes axially from the support base. The stop is arranged close to the tubular portion and comprises a height smaller than the height of the tubular portion with respect to the support base. The difference between the height of the tubular portion and the height of the stop, and the gap between the tubular portion and the stop are such that, in use, from a given radial deformation level of the tubular portion, the tubular portion comes into contact with the stop, increasing the rigidity of the tubular portion.

19 Claims, 4 Drawing Sheets

(56) References Cited

U.S. PATENT DOCUMENTS

| | | | | |
|---|---|---|---|---|
| 4,139,053 A * | 2/1979 | Schaal | ............... | F01P 11/0276 165/71 |
| 4,519,467 A * | 5/1985 | Saunders | ............... | B60K 11/04 165/41 |
| 4,579,184 A * | 4/1986 | Hiramoto | ............... | B60K 11/04 165/67 |
| 4,651,839 A * | 3/1987 | Isobe | ............... | B60K 11/04 180/68.4 |
| 4,858,866 A * | 8/1989 | Werner | ............... | B60K 11/04 248/213.3 |
| 5,123,625 A * | 6/1992 | Spaltofski | ............... | F16F 1/376 248/634 |
| 5,170,985 A * | 12/1992 | Killworth | ............... | B60G 99/004 248/634 |
| 5,544,714 A * | 8/1996 | May | ............... | B60K 11/04 165/67 |
| 5,605,200 A * | 2/1997 | Mayberry | ............... | B60K 11/04 180/68.4 |
| 5,758,860 A * | 6/1998 | Hanazaki | ............... | B60K 11/04 180/68.4 |
| 5,785,140 A * | 7/1998 | Suzuki | ............... | B60K 11/04 165/67 |
| 5,911,936 A * | 6/1999 | Hanazaki | ............... | B29C 45/14065 248/634 |
| 6,296,237 B1 * | 10/2001 | Nagai | ............... | B60G 7/04 267/140 |
| 6,349,928 B1 * | 2/2002 | Ko | ............... | B60K 11/04 165/69 |
| 6,408,933 B2 * | 6/2002 | Fukuoka | ............... | F28F 9/002 165/67 |
| 6,550,558 B2 * | 4/2003 | Yorwarth | ............... | B60K 11/04 16/2.1 |
| 6,668,956 B1 * | 12/2003 | Pelage | ............... | B60K 11/04 180/312 |
| 6,874,570 B2 * | 4/2005 | Horiuchi | ............... | F28D 1/0443 165/140 |
| 7,309,200 B2 * | 12/2007 | Schmieder | ............... | B62D 25/084 411/103 |
| 7,669,677 B2 * | 3/2010 | Ko | ............... | B60K 11/04 180/68.4 |
| 8,016,275 B2 * | 9/2011 | Ting | ............... | F16F 1/376 165/69 |
| 8,051,933 B2 * | 11/2011 | Hwang | ............... | B60K 11/04 180/68.4 |
| 8,066,266 B2 * | 11/2011 | Rodecker | ............... | F16F 1/3732 180/296 |
| 8,210,298 B2 * | 7/2012 | Hemmersmeier | ............... | F28F 9/002 180/68.4 |
| 8,210,299 B2 * | 7/2012 | Streeter | ............... | F28F 9/002 165/67 |
| 8,376,331 B2 * | 2/2013 | Rodecker | ............... | F01N 13/1811 180/296 |
| 8,672,305 B2 * | 3/2014 | Wolf | ............... | B25F 5/006 173/162.2 |
| 8,826,538 B2 * | 9/2014 | Itoh | ............... | B60K 11/04 180/68.4 |
| 9,238,403 B2 * | 1/2016 | Kim | ............... | B60K 11/04 |
| 9,592,728 B1 * | 3/2017 | Mickley | ............... | B62D 25/085 |
| 9,884,655 B1 * | 2/2018 | Nagayoshi | ............... | B60K 11/04 |

FOREIGN PATENT DOCUMENTS

| | | |
|---|---|---|
| JP | 2008213496 A | 9/2008 |
| JP | 2012180901 A | 9/2012 |

\* cited by examiner

RADIATOR SUPPORT

CROSS-REFERENCE TO RELATED APPLICATIONS

This application relates to and claims the benefit and priority to European Application No. EP18382218.8, filed Mar. 28, 2018.

TECHNICAL FIELD

The present invention relates to radiator supports, and more specifically to supports comprising a support base and a tubular portion which protrudes from the support base and in which a pin of the radiator is housed.

BACKGROUND

Radiator supports comprising a support base and a tubular portion protruding from the support base in an axial direction are known. The pin of a radiator of a motor vehicle is housed inside the tubular portion.

The radiator usually comprises two top pins and two bottom pins, such that the radiator is secured to a frame or part of the chassis of the vehicle through four radiator supports. The supports must be capable of absorbing vibrations of the radiator in order to not transmit them to the inside of the vehicle, so they are usually made of rubber.

In this sense, JP2012180901A describes a radiator support comprising a support base comprising a radially protruding circular ring, and a tubular portion which protrudes from the support base in an axial direction and is configured for housing a pin of a radiator of a motor vehicle. The radiator support also comprises several stops protruding from the support base in an axial direction, the stops having a height slightly smaller than the height of the tubular portion with respect to the support base. The stops are arranged at the end of the circular ring such that the area, i.e., the radial protuberance of the circular ring, is prevented from becoming excessively deformed.

SUMMARY

According to some embodiments a radiator support is provided that comprises a support base, an elastic tubular portion which protrudes from the support base in an axial direction and is configured for housing a pin of a radiator of a motor vehicle, and at least one stop which protrudes from the support base in an axial direction. The stop is arranged close to the tubular portion and comprises a height smaller than the height of the tubular portion with respect to the support base.

The difference between the height of the tubular portion and the height of the stop, and the gap between the tubular portion and the stop are such that in use, from a given radial deformation level of the tubular portion, the tubular portion comes into contact with the stop, thereby increasing the rigidity of the tubular portion, such that the tubular portion has a flexible behavior before reaching the radial deformation level and a rigid behavior once the radial deformation level is reached.

In the context of the invention, "rigid behavior" must be interpreted not as a completely rigid behavior, but rather as a more rigid behavior than what corresponds to the behavior when the tubular portion does not come into contact with the stop, i.e., a more rigid behavior than the "flexible behavior."

The radiator support allows providing the support with different levels of rigidity such that it can adapt to the different use requirements or conditions, without sacrificing vehicle comfort. In this manner, and in normal use conditions in which the vehicle travels on a terrain with few potholes, the support has a flexible behavior where it is capable of damping the vibrations of the radiator without sacrificing vehicle comfort.

However, when the vehicle travels on a more uneven terrain with many potholes, for example, the support is rigid enough so as to withstand the rocking movements of the radiator since, in these conditions, the support is capable of increasing the rigidity of the support where it is needed. As the skilled person knows, the more rigid the support is, the worse it will be in absorbing vibrations, i.e., most of the vibrations are transmitted to the inside of the vehicle, negatively affecting vehicle comfort.

The use of an excessively rigid support which can negatively affect vehicle comfort from the outset is therefore prevented with the radiator support.

These and other advantages and features will become evident in view of the drawings and detailed description.

DETAILED DESCRIPTION

Figure 1:
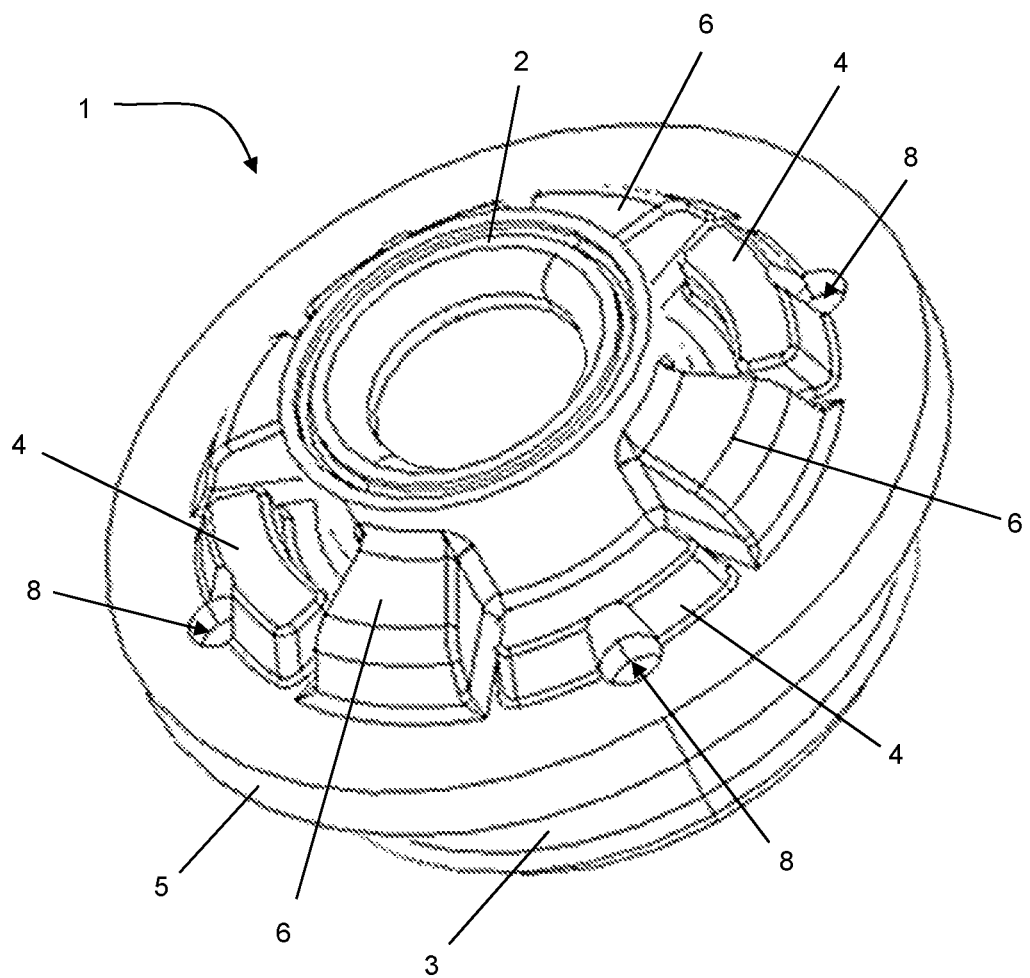
FIG. 1 shows a perspective view of a radiator support according to one embodiment.
Figure 4:
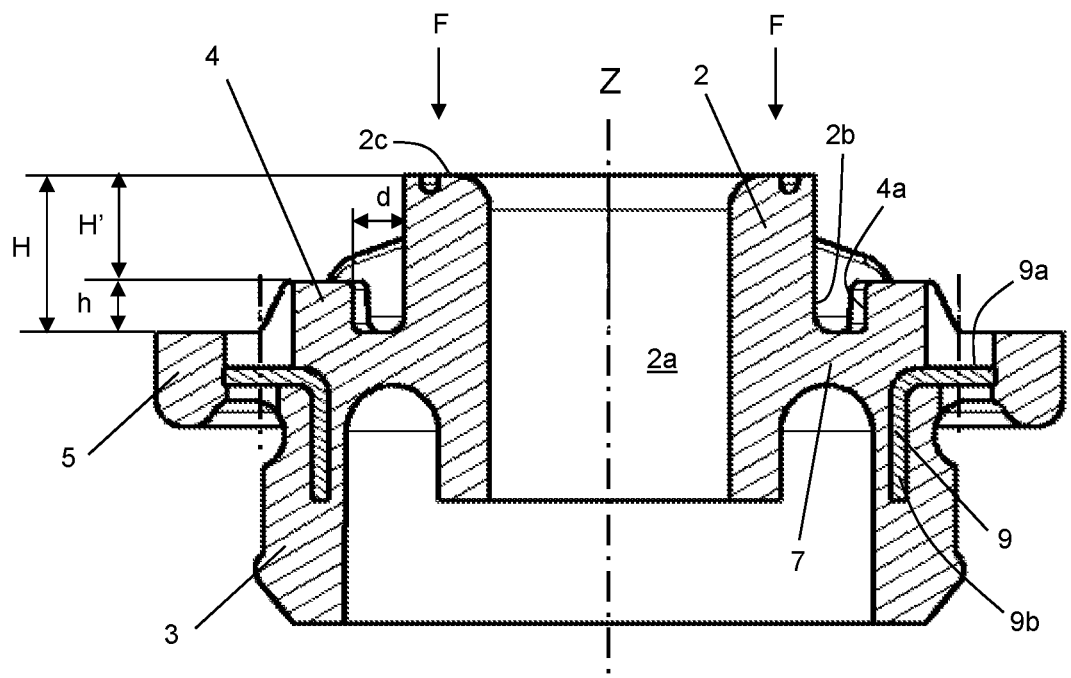
FIG. 4 shows a section view of the radiator support of FIG. 1.

FIG. 1 shows the radiator support 1 according to one embodiment. As shown in the drawing, the radiator support 1 comprises a support base 3, an elastic tubular portion 2 which protrudes from the support base 3 in an axial direction Z and is configured for housing a pin 10a of a radiator 10 of a motor vehicle, and at least one stop 4 which protrudes from the support base 3 in the axial direction Z. The stop 4 is arranged close to the tubular portion 2 and comprises a height h smaller than the height H of the tubular portion 2 with respect to the support base 3, as seen in FIG. 4. The elastic tubular support has an internal vertically disposed through opening 2a with a central axis Z, the through opening 2a being configured to receive the pin 10a of the radiator 10. The elastic tubular portion 2 also includes an outer peripheral surface 2b that faces radially outward and a top surface 2c that faces vertically upward. The top surface 2c is configured to receive a downward axially applied force F imposed by the radiator 2. The stop 4 has an outer surface 4a that faces the outer peripheral surface 2b of the elastic tubular portion 2, there existing a radial gap d between the two surfaces.

The difference H' between the height H of the tubular portion 2 and the height h of the stop 4, and the gap "d" between the tubular portion 2 and the stop 4 are such that, in use, from a given radial deformation level of the tubular portion 2, the tubular portion 2 comes into contact with the stop 4, thereby increasing the rigidity of the tubular portion 2, such that the tubular portion 2 has a flexible behavior before reaching the radial deformation level and a rigid behavior once the radial deformation level is reached.

Figure 5:
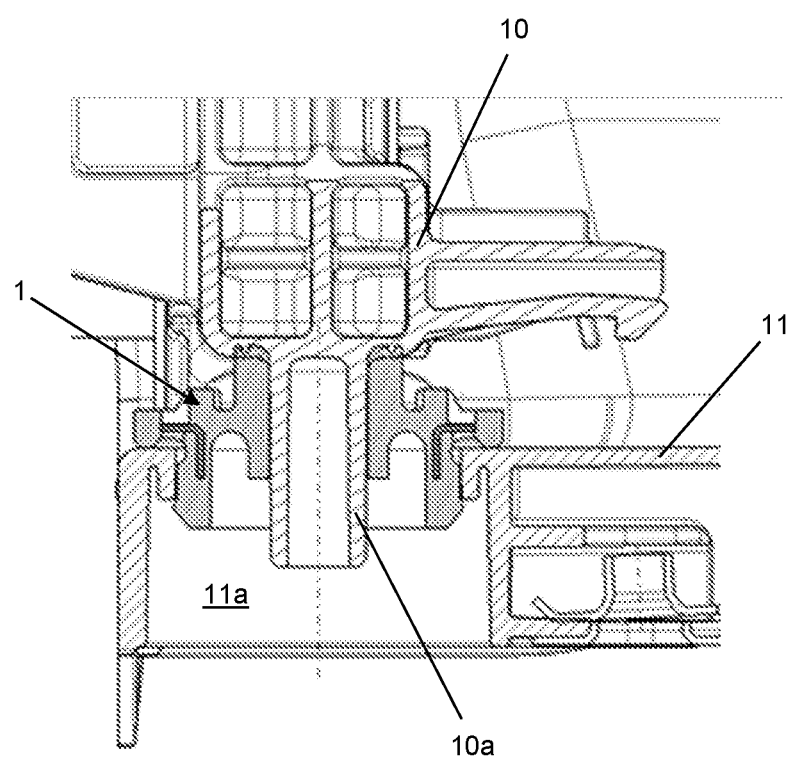
FIG. 5 shows a section view of a portion of the assembly of the radiator support of FIG. 1 in the vehicle.

The support base 3 is used for fixing the support 1 to a frame or part of the chassis 11 of the vehicle, whereas the pin 10a of the radiator 10 is housed inside the tubular portion 2. The radiator 10 is therefore practically supported in the elastic tubular portion 2, as seen in FIG. 5, which portion is axially and radially deformed in use, preventing the transmission of vibrations caused by the radiator 10 to the support base 3.

In this manner, and in normal use conditions in which the vehicle travels on a terrain with few irregularities or potholes, the support 1 has a "flexible" behavior where it is capable of damping the vibrations of the radiator 10 without sacrificing vehicle comfort. "Flexible" behavior is understood as the tubular portion 2 being capable of deforming as necessary, minimizing the transmission of vibrations to the support base 3.

However, when the vehicle travels on a more uneven terrain with many potholes or irregularities, for example, the pressure exerted by the radiator 10 on the support 1 is greater, so the support 1 must increase its rigidity in this case so as to be able to withstand the pressure and the rocking movements exerted by the radiator 10.

Therefore, in the context of the invention "rigid behavior" must be interpreted not as a completely rigid behavior, but rather as a more rigid behavior than what corresponds to the behavior when the tubular portion 2 does not come into contact with the stop 4, i.e., a more rigid behavior than the "flexible behavior."

As the skilled person knows, the more rigid a support is, the worse it will be in absorbing vibrations, i.e., most of the vibrations are transmitted to the inside of the vehicle, negatively affecting vehicle comfort.

The use of an excessively rigid support which can negatively affect vehicle comfort from the outset is therefore prevented with the radiator support 1 since the support 1 of the invention is capable of increasing its rigidity only when necessary.

Figure 2:
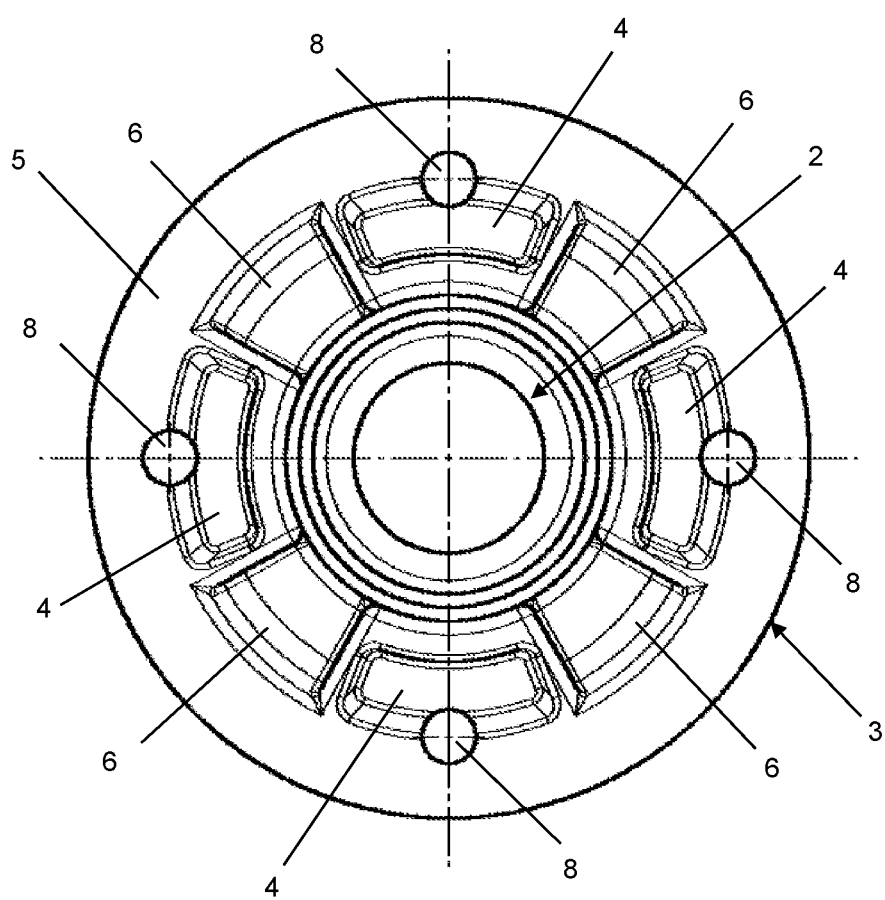
FIG. 2 shows a plan view of the radiator support of FIG. 1.

The radiator support 1 can comprise two stops 4 arranged at 180°, but according to one embodiment the support 1 comprises four stops 4 protruding from the support base 3 in the axial direction Z, as shown in the drawings. The stops 4 are equidistant from one another, so they are arranged at 90°, as seen in FIG. 2.

The support 1 is fixed to the frame or part of the chassis 11 of the vehicle through the base body 3 which is housed in a housing 11a of the frame or part of the chassis 11, both components preferably being fixed by pressure such that the support 1 is snapped into the housing 11a. Furthermore, the weight of the radiator 10 itself exerts pressure in the axial direction Z which helps to keep the support 1 in place, i.e., in the housing 11a.

The radial gap "d" between the tubular portion 2 and each stop 4 when the support 1 is in a rest state, i.e., without the radiator 10 mounted on the support 1, is in a range between about 2 mm and 5 mm, the gap "d" preferably being 3 mm.

The difference H' between the height H of the tubular portion 2 and the height h of each stop 4, when the support 1 is in the rest state, i.e., without the radiator mounted on the support 1, is in a range between about 5.5 mm and 8 mm, the height preferably being 6.2 mm. When the radiator 10 is mounted on the support 1, this height H' is initially reduced due to the actual weight of the radiator 10. This situation arises, for example, when the vehicle is stopped. However, in use, i.e., when the vehicle is moving, the difference in height H' and the radial gap "d" vary depending on the pressure exerted by the radiator 10 which will vary according to the conditions of the terrain on which the vehicle travels. The notation "d" in FIG. 4 also represents a width of the radial gap.

The gap "d" and the difference in height H' at the beginning, i.e., when the support 1 is at rest, allow assuring that, when the support 1 is in use, the tubular portion 2 comes into contact with the stops 4 from a given radial deformation level of the tubular portion 2, before the radiator 10 itself comes into contact with any other element or component of the radiator support 1, i.e., assuring that the radiator 10 does not come into contact with any other element or component of the support 1 even in the worst case scenario.

Since the tubular portion 2 radially comes into contact with the stops 4, the rigidity of the tubular portion 2 dramatically increases. The tubular portion 2 will no longer become deformed as easily and will be able to withstand the increase in pressure exerted by the radiator 10 under extreme conditions, for example, on a terrain with many potholes or irregularities.

When use conditions improve, for example, when the vehicle is again travelling on a terrain without potholes, the pressure exerted by the radiator 10 on the tubular portion 2 decreases, so the tubular portion 2 will try to recover its original state, separating again from the stops 4, thereby again recovering the initial "flexible" behavior which assures the desired comfort level in the vehicle.

According to one embodiment, the support base 3 comprises a radially protruding circular ring 5 arranged in the upper part, the stops 4 being arranged close to the circular ring 5, i.e., away from the end of the circular ring 5, as shown in the drawings.

To reinforce the circular ring 5, the support base 3 comprises an inverted L-shaped reinforcement element 9 having a first portion 9a and a second portion 9b, which may be a metallic element that is embedded in the support base 3, as seen in FIG. 4. According to one embodiment, the reinforcement element 9 is arranged between the circular ring 5 and the support base 3, i.e., the first portion of the reinforcement element 9 is arranged inside the circular ring 5 and the second portion is arranged at about 90° with respect to the first portion in the support base 3, and arranged parallel to the axial direction Z. According to one embodiment the reinforcement element 9 is an element of revolution, i.e., the reinforcement element 9 is contained in the support base 3 extending all the way around the support base.

The support base 3 comprises holes 8 which are arranged in the support base 3, as seen in FIG. 1 or 2. The holes 8 are made during the process of manufacturing the support 1 in order to keep the reinforcement element 9 centered during the manufacturing process.

According to one embodiment, the tubular portion 2 and the support base 3 are attached to one another by a radial extending rib 7 which attaches part of the inside of the support base 3 with part of the outer area of the tubular portion 2, the thickness of the rib 7 being such that it allows the tubular portion 2 to become deformed independently of the support base 3 but assuring a minimum resistance in the attachment of the tubular portion 2. According to one embodiment, the rib 7 is circular and surrounds the tubular portion 2.

As seen in FIG. 4, the rib 7 is arranged in the upper area of the support base 3.

Figure 3:
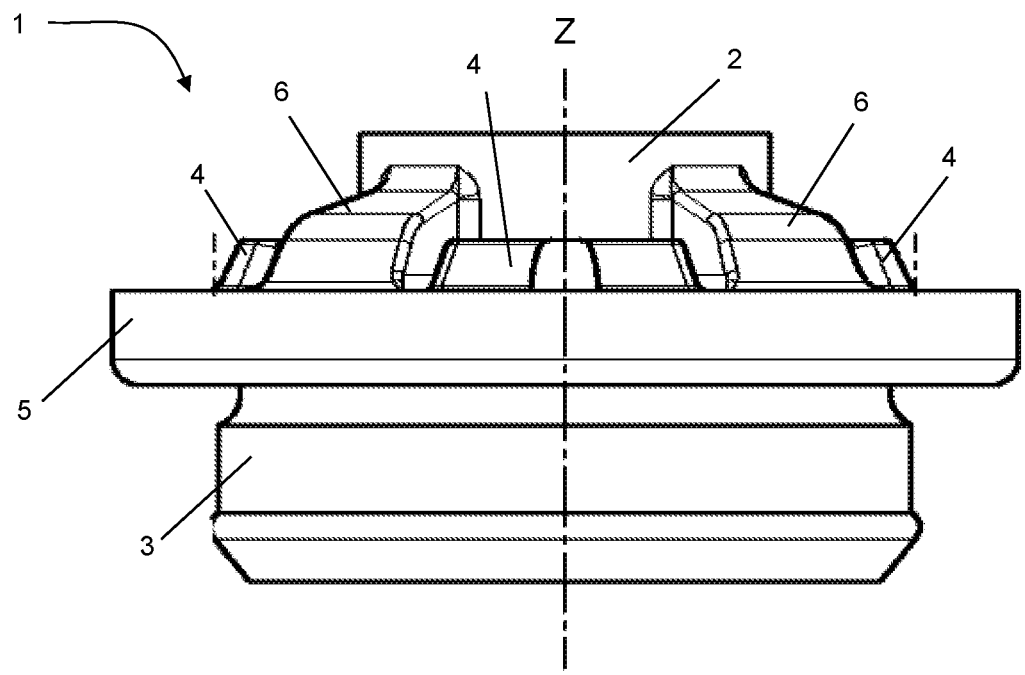
FIG. 3 shows an elevational view of the radiator support of FIG. 1.

As seen in FIG. 1, 2, or 3, the support 1 may additionally comprise at least one protuberance 6 attaching the outer surfaces of the support base 3 and the tubular portion 2. According to one embodiment, the support 1 comprises four protuberances 6 arranged interspersed between the stops 4, as seen in FIG. 2, for example. These protuberances 6 contribute to the initial behavior of the tubular portion 2. In other words, the tubular portion 2 must initially comprise a rigidity assuring that the tubular portion 2 can support the weight of the radiator itself, the initial rigidity being the lowest possible for such purpose, such that the "flexible" behavior of the tubular portion 2 which assures comfort in the vehicle interior is not compromised.

The tubular portion 2 may be made of plastic, preferably EPDM or rubber, the support base 3 being made of the same material, i.e., EPDM or rubber according to one embodiment.

According to one embodiment, the radiator support 1 is formed by a part made of EPDM or rubber, i.e., the support base 3 and the tubular portion 2 form one part. Both parts, i.e., the support base 3 and the tubular portion 2, are attached to one another by the radial rib 7 and additionally by the protuberances 6.

The following clauses disclose additional embodiments.

Clause 1. A radiator support comprising a support base (3), an elastic tubular portion (2) which protrudes from the support base (3) in an axial direction (Z) and is configured for housing a pin of a radiator of a motor vehicle, and at least one stop (4) which protrudes from the support base (3) in the axial direction (Z), the stop (4) being arranged close to the tubular portion (2), the stop (4) having a height (h) smaller than the height (H) of the tubular portion (2) with respect to the support base (3), the difference (H') between the height (H) of the tubular portion (2) and the height (h) of the stop (4), and the gap (d) between the tubular portion (2) and the stop (4) are such that in use, from a given radial deformation level of the tubular portion (2), the tubular portion (2) comes into contact with the stop (4), thereby increasing the rigidity of the tubular portion (2), such that the tubular portion (2) has a flexible behavior before reaching the radial deformation level and a rigid behavior once the radial deformation level is reached.

Clause 2. A radiator support according to clause 1, wherein the support (1) comprises at least two stops (4), preferably four, protruding from the support base (3) in the axial direction (Z), the stops (4) preferably being arranged equidistant from one another.

Clause 3. A radiator support according to clause 1 or 2, wherein when the support (1) is at rest the difference (H') between the height (H) of the tubular portion (2) and the height (h) of the stop (4) is in a range between about 5.5 mm and 8 mm, and wherein the gap (d) between the tubular portion (2) and the stop (4) is in a range between about 2 mm and 5 mm.

Clause 4. A radiator support according to clause 3, wherein when the support (1) is at rest the difference (H') between the height (H) of the tubular portion (2) and the height (h) of the stop (4) is about 6.2 mm, and wherein the gap (d) between the tubular portion (2) and the stop (4) is about 3 mm.

Clause 5. A radiator support according to any of the preceding clauses, wherein the support base (3) comprises a radially protruding circular ring (5) arranged in the upper part, the stop (4) being arranged close to the circular ring (5).

Clause 6. A radiator support according to clause 5, wherein the support base (3) comprises an inverted L-shaped reinforcement element (9), preferably a metallic element, embedded in the support base (3), preferably arranged between the circular ring (5) and the support base (3).

Clause 7. A radiator support according to any of clauses 2 to 6, wherein the support base (3) additionally comprises at least one protuberance (6) attached to the tubular portion (2) such that the protuberance (6) contributes to the initial flexible behavior of the tubular portion (2).

Clause 8. A radiator support according to clause 7, wherein the support base (3) comprises protuberances (6) arranged interspersed between the stops (4).

Clause 9. A radiator support according to any of the preceding clauses, wherein the tubular portion (2) and the support base (3) are attached to one another by a perimetral radial rib (7) which attaches part of the inside of the support base (3) with part of the outer area of the tubular portion (2).

Clause 10. A radiator support according to clause 9, wherein the rib (7) is arranged in the upper area of the support base (3).

Clause 11. A radiator support according to any of the preceding clauses, wherein the tubular portion (2) is made of EPDM or rubber.

Clause 12. A radiator support according to clause 11, wherein the support base (3) is made of plastic, preferably EPDM or rubber.

Clause 13. A radiator support according to any of the preceding clauses, wherein the support base (3) and the tubular portion (2) form one part, preferably made of EPDM or rubber.

What is claimed is:

1. A radiator support comprising:
   a support base having a central axis,
   an elastic tubular portion which protrudes vertically from the support base by a first height in an axial direction, the elastic tubular portion having a vertical through opening that is configured to house a pin of a radiator of a motor vehicle, the elastic tubular portion including an outer peripheral surface that faces radially outward, the elastic tubular portion having a top surface that faces vertically upward; and
   a first stop that protrudes vertically from the support base by a second height in the axial direction, the second height being less than the first height, the first stop including an outer surface that faces a first portion of the outer peripheral surface of the elastic tubular portion with there being a first radial gap separating the outer surface of the first stop and the first portion of the outer peripheral surface of the elastic tubular portion;
   the elastic tubular portion being radially deformable upon there being a downward axially applied force to the top surface of the elastic tubular portion to cause a closing of the first radial gap when a threshold downward axially applied force is applied to the top surface of the elastic tubular portion so that the first portion of the outer peripheral surface of the elastic tubular portion comes into contact with the outer surface of the first stop, the elastic tubular portion having a first rigidity when the first radial gap is not closed and a second rigidity when the first radial gap is closed, the second rigidity being greater than the first rigidity.

2. The radiator support according to claim 1, comprising a second stop that protrudes vertically from the support base by the second height in the axial direction, the second stop including an outer surface that faces a second portion of the outer peripheral surface of the elastic tubular portion with there being a second radial gap separating the outer surface of the second stop and the second portion of the outer peripheral surface of the elastic tubular portion, the second radial gap being configured to close when the threshold downward axially applied force is applied to the top surface of the elastic tubular portion so that the second portion of the outer peripheral surface of the elastic tubular portion comes into contact with the outer surface of the second stop.

3. The radiator support according to claim 2, wherein the first and second stops are spaced apart from one another equidistantly around the elastic tubular support.

4. The radiator support according to claim 2, wherein the support base comprises a first vertically extending protuberance and a second vertical extending protuberance that are respectively attached to first and second parts of the elastic tubular portion, each of the first and second vertically extending protuberances being located between the first and second stops.

5. The radiator support according to claim 1, wherein the radiator support has a rest state, when the radiator support is in the rest state a difference between the first and second heights is in a range between 5.5 millimeters and 8 millimeters and the first radial gap has a width dimension in a range between 2 millimeters and 5 millimeters.

6. The radiator support according to claim 1, wherein the support base includes a radially protruding ring, the first stop being located radially inward of the radially protruding ring.

7. The radiator support according to claim 6, wherein the radially protruding ring is circular.

8. The radiator support according to claim 6, further comprising an inverted L-shaped reinforcement element embedded in the support base.

9. The radiator support according to claim 8, wherein the inverted L-shaped reinforcement element has a first portion that extends into the radially protruding ring of the support base.

10. The radiator support according to claim 9, wherein the inverted L-shaped reinforcement element includes the first portion and a second portion, the first portion being disposed substantially perpendicular to the central axis of the support base, the second portion being disposed substantially parallel to the central axis of the support base.

11. The radiator support according to claim 9, wherein the inverted L-shaped reinforcement element is a metallic element.

12. The radiator support according to claim 1, wherein the support base includes at least one vertically extending protuberance that is attached to the elastic tubular portion, the at least one protuberance affecting the rigidity of the elastic tubular portion.

13. The radiator support according to claim 12, wherein the elastic tubular portion and the support base are further attached to one another by a radially extending rib that spans between the elastic tubular part and the support base.

14. The radiator support according to claim 1, wherein the elastic tubular portion and the support base are attached to one another by a radially extending rib that spans between the elastic tubular part and the support base.

15. The radiator support according to claim 14, wherein the radially extending rib spans between the elastic tubular part and an upper part of the support base.

16. The radiator support according to claim 1, wherein the elastic tubular portion is made of a material selected from the group consisting of EPDM and rubber.

17. The radiator support according to claim 16, wherein the support base is made of a material selected from the group consisting of EPDM and rubber.

18. The radiator support according to claim 1, wherein the support base and the elastic tubular portion are made from a single piece of material.

19. The radiator according to claim 18, wherein the material is selected from the group consisting of EPDM and rubber.

\* \* \* \* \*